(12) United States Patent
Hildebrand

(10) Patent No.: US 11,196,692 B2
(45) Date of Patent: Dec. 7, 2021

(54) SOCIAL CONTRACT BASED MESSAGING PLATFORM

(71) Applicant: A Social Company, Palos Verdes Peninsula, CA (US)

(72) Inventor: Harold R. Hildebrand, Palos Verdes Peninsula, CA (US)

(73) Assignee: A SOCIAL COMPANY, Palos Verdes Peninsula, CA (US)

( * ) Notice: Subject to any disclaimer, the term of this patent is extended or adjusted under 35 U.S.C. 154(b) by 0 days.

(21) Appl. No.: 16/286,877

(22) Filed: Feb. 27, 2019

(65) Prior Publication Data
US 2020/0274838 A1    Aug. 27, 2020

(51) Int. Cl.
| | | |
|---|---|---|
| H04L 12/58 | (2006.01) | |
| H04N 5/232 | (2006.01) | |
| G06F 15/16 | (2006.01) | |
| G06K 9/00 | (2006.01) | |
| G06F 40/30 | (2020.01) | |
| G06Q 50/00 | (2012.01) | |

(52) U.S. Cl.
CPC ............ *H04L 51/12* (2013.01); *G06F 40/30* (2020.01); *G06K 9/00335* (2013.01); *G06K 9/00744* (2013.01); *H04L 51/10* (2013.01); *H04L 51/32* (2013.01); *G06Q 50/01* (2013.01)

(58) Field of Classification Search
CPC ......... H04L 51/12; H04L 51/10; H04L 51/32; G06F 40/30; G06K 9/00744; G06K 9/00335; G06Q 50/01

USPC .......................................................... 709/206
See application file for complete search history.

(56) References Cited

U.S. PATENT DOCUMENTS

| | | | |
|---|---|---|---|
| 10,204,308 B2* | 2/2019 | Deas | G06Q 10/083 |
| 10,419,375 B1* | 9/2019 | Sokolov | H04L 51/32 |
| 10,694,255 B2* | 6/2020 | Taylor | H04N 21/4334 |
| 2006/0168065 A1* | 7/2006 | Martin | G06Q 10/107 709/206 |
| 2007/0186231 A1* | 8/2007 | Haeuser | H04N 7/163 725/25 |
| 2008/0002941 A1* | 1/2008 | Zheng | H04N 7/147 386/292 |
| 2008/0056942 A1* | 3/2008 | Arima | G01N 35/1004 422/63 |
| 2009/0210504 A1* | 8/2009 | Shuster | H04L 51/30 709/206 |
| 2010/0036697 A1* | 2/2010 | Kelnar | G06Q 30/0283 705/7.11 |
| 2011/0107362 A1* | 5/2011 | Reilly | H04N 21/472 725/23 |
| 2011/0219135 A1* | 9/2011 | Minamizawa | H04L 51/28 709/230 |

(Continued)

*Primary Examiner* — David R Lazaro
*Assistant Examiner* — Berhanu Shitayewoldetadik
(74) *Attorney, Agent, or Firm* — Arent Fox LLP

(57) ABSTRACT

Disclosed is a social contract-based messaging platform. The social contract can be that messages exchanged between users spread or create a positive emotion, such as happiness. Any message that a recipient found to generate a negative emotion can be found to be in violation of the social contract, and the messaging platform can restrict the senders of such messages from spreading negative emotions by suspending their writing privileges. Thus, the messaging platform can encourage users to spread positive emotions.

20 Claims, 11 Drawing Sheets

(56) References Cited

U.S. PATENT DOCUMENTS

| | | | |
|---|---|---|---|
| 2011/0231401 A1* | 9/2011 | Bocking | G06F 16/907 |
| | | | 707/740 |
| 2013/0125026 A1 | 5/2013 | Gaume | |
| 2013/0185368 A1* | 7/2013 | Nordstrom | H04W 4/21 |
| | | | 709/206 |
| 2014/0052656 A1* | 2/2014 | Ball | G06Q 10/1053 |
| | | | 705/319 |
| 2014/0096167 A1 | 4/2014 | Lang et al. | |
| 2014/0193047 A1* | 7/2014 | Grosz | G06Q 10/10 |
| | | | 382/118 |
| 2014/0274307 A1* | 9/2014 | Gonzalez | A63F 13/655 |
| | | | 463/25 |
| 2014/0344718 A1* | 11/2014 | Rapaport | H04L 51/32 |
| | | | 715/753 |
| 2014/0359656 A1* | 12/2014 | Banica | H04N 21/234 |
| | | | 725/32 |
| 2014/0363074 A1* | 12/2014 | Dolfing | G06K 9/6821 |
| | | | 382/156 |
| 2014/0363083 A1* | 12/2014 | Xia | G06K 9/00422 |
| | | | 382/189 |
| 2015/0156543 A1* | 6/2015 | Allegretti | H04N 21/23418 |
| | | | 725/12 |
| 2015/0304268 A1* | 10/2015 | Byttow | G06Q 50/01 |
| | | | 709/206 |
| 2016/0012133 A1* | 1/2016 | Shim | G06F 16/951 |
| | | | 707/741 |
| 2016/0072797 A1* | 3/2016 | Wilson | H04N 21/431 |
| | | | 726/9 |
| 2016/0077598 A1* | 3/2016 | Lection | G06K 9/00335 |
| | | | 345/156 |
| 2016/0092044 A1* | 3/2016 | Laska | H04L 9/085 |
| | | | 715/721 |
| 2016/0203566 A1* | 7/2016 | Kataria | G06Q 10/06398 |
| | | | 709/206 |
| 2016/0234551 A1* | 8/2016 | Allegretti | H04N 21/23418 |
| 2016/0366203 A1 | 12/2016 | Blong et al. | |
| 2017/0019496 A1* | 1/2017 | Orbach | G06Q 30/00 |
| 2017/0155515 A1* | 6/2017 | Androulaki | H04L 9/008 |
| 2017/0357782 A1* | 12/2017 | Leske | H04N 21/2541 |
| 2018/0077096 A1* | 3/2018 | DeMattei | G06F 16/9566 |
| 2018/0183595 A1 | 6/2018 | Raduchel | |
| 2018/0234738 A1* | 8/2018 | Sarkar | H04N 21/4223 |
| 2018/0324496 A1* | 11/2018 | Taylor | H04N 21/4788 |
| 2018/0338088 A1* | 11/2018 | Wakana | H04N 5/23229 |
| 2018/0374164 A1* | 12/2018 | Ozog | G06Q 30/0269 |
| 2019/0124021 A1* | 4/2019 | DeMattei | G06F 3/0488 |
| 2019/0215772 A1* | 7/2019 | Anderson | H04L 67/00 |
| 2019/0286244 A1* | 9/2019 | Lection | G06K 9/00335 |
| 2020/0028810 A1* | 1/2020 | Werner | G06K 9/00302 |
| 2020/0344527 A1* | 10/2020 | Taylor | H04N 21/4334 |
| 2020/0358908 A1* | 11/2020 | Scalisi | H04N 5/232411 |

* cited by examiner

SOCIAL CONTRACT BASED MESSAGING PLATFORM

BACKGROUND

Current social networks or messaging platforms allow users to connect with other users and interact with each other. For example, some social networks allow users to post messages, images, videos and receive comments or a "like" for their posts. These social networks focus on content sharing, building new relationships and growing the social network of a user, e.g., having more and new friends in the user's social network. While these social networks help in growing a user's social network and content sharing, they do not aid in strengthening of an existing relationship between users, promoting a positive emotion, e.g., happiness, or restricting spreading of a negative emotion. Some studies indicate that some users of these social networks experience negative emotions, such as, depression, low self-esteem, and bitter jealousy among the users. The studies found that one of the reasons for such a feeling to be "social comparison," in which individuals were more likely to compare themselves to others better off than they were and that they would be more bothered by being tagged in unflattering pictures. Those with major depressive disorder were less likely to post pictures of themselves along with other people and reported fewer followers. The current social networks do not aid in strengthening an existing relationship of a user or promoting a positive emotion, e.g., happiness, and restricting spreading of a negative emotion.

BRIEF DESCRIPTION OF THE DRAWINGS

FIG. 5 is a block diagram of the social networking system, consistent with various embodiments.

FIG. 6 is a flow diagram of a process for managing access transactions associated with sharing a media content using a blockchain, consistent with various embodiments.

DETAILED DESCRIPTION

Embodiments are directed to a social contract-based messaging platform. The social contract can be that messages exchanged between users spread or create a positive emotion, such as happiness. Any message that a recipient found to generate a negative emotion can be found to be in violation of the social contract, and the messaging platform can restrict senders of such messages from spreading negative emotion, e.g., by suspending their writing privileges. Thus, the messaging platform can encourage users to spread positive emotions. When a recipient receives a message, the recipient indicates to the messaging platform a type of emotion, e.g., a positive emotion (which is in accordance with the social contract) or a negative emotion (which is in violation of the social contract), the message generated in the recipient. The messaging platform tracks various metrics regarding users of the messaging platform, such as a number of times a specified user has violated the social contract, a percentage of messages sent by the specified user that is found in violation of the social contract, a number of times the specified user is reported to the messaging platform, or a frequency of the violation. The messaging platform can suspend the writing privileges of the specified user when one or more metrics exceed their thresholds, which prevents the user from sending messages and therefore, stop spreading of negative emotions by the specified user. After the suspension, the specified user may continue to receive messages from other users but would not be able to send messages to other users.

The messaging platform encourages spreading of positive emotions. For example, when a recipient of a message indicates to the messaging platform that the message generated a positive emotion, a sender of the message is made aware of that, which encourages the sender to send messages that generate a positive emotion. In another example, the messaging platform enables the recipient to send a reaction of the recipient in reading the message to the sender, which can further encourage the sender to continue sending messages that generate such positive emotion. The reaction can be a video recording of the recipient reading the message and his/her reaction to the message. Such exchanges between a pair of users in which (a) a message generates a positive emotion in the recipient, (b) the recipient sends a video recording of the reaction to the sender, and (c) the sender experiences a positive emotion upon viewing the video recording of the reaction of the recipient, not only promotes generating positive emotion between the pair of users, but also aids in strengthening the relationship between the pair of users.

Figure 1:
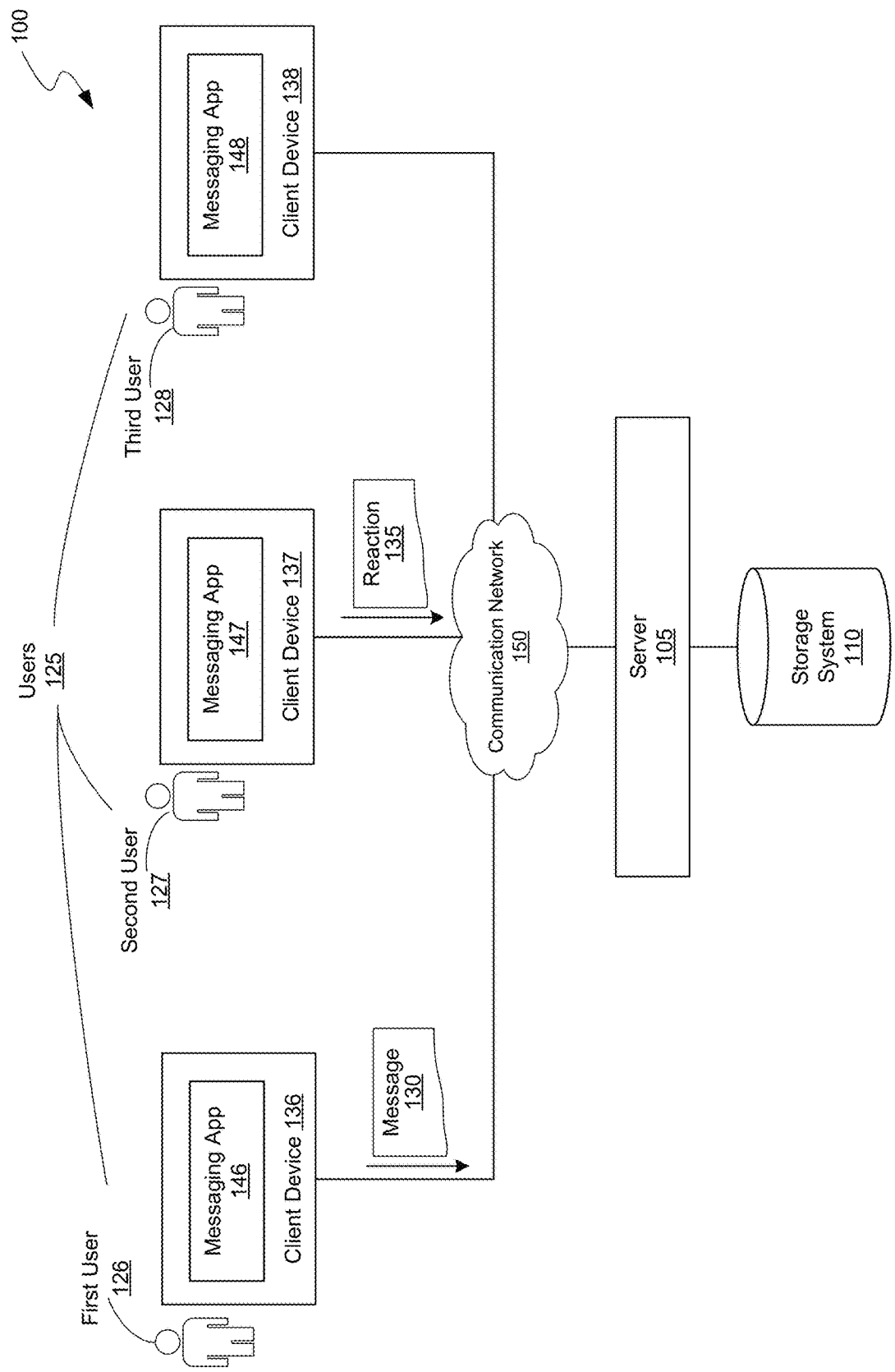
FIG. 1 is a block diagram of an environment in which the disclosed embodiments can be implemented.

Turning now to FIG. 1, FIG. 1 is a block diagram of an environment 100 in which the messaging platform can be implemented. The environment 100 includes a server 105, which implements at least a portion of the messaging platform and facilitates exchanging of messages between users 125 of the messaging platform. The messaging platform also includes a client-side portion that enables a user to send or receive messages, among other functionalities of the messaging platform. The client-side portion can be implemented as an app, e.g., a mobile app, which can be installed and executed on client devices 136-138 associated with users 125. The client-side portion of the messaging platform can also be implemented as a browser-based application, which can be accessed using a web browser application on the client devices 136-138. An executable file for generating the app can be stored at the server 105, storage system 110 associated with the server 105, or at a different location that is accessible by the client devices 136-138. Users 125 can install the app in their respective client devices 136-138 by downloading the app from any of the above locations. A client device can be any of a desktop, laptop, tablet PC, smartphone, wearable device or any computing device that is capable of accessing the server 105 over a communication network 150 and is capable recording videos, sending and/or receiving multimedia content from a user, In the following paragraphs the client-side portion of the messaging platform is implemented as an app (also referred to as "messaging app"). Each of the users 125 can install the messaging app on their respective client devices. For example, the first user 126 can install the messaging app ("messaging app 146") on the client device 136, the second user 127 can install the messaging app ("messaging app 147") on the client device 138, and the third user 128 can install the messaging app ("messaging app 148") on the client device 138. The messaging apps installed on The messaging platform encourages the users 125 to exchange messages between them in accordance with a social contract, e.g., promote a positive emotion among the users 125, and restricts those of the users 125 who send messages that are in violation of the social contract, e.g., messages that generate negative emotions in a recipient, by suspending writing privileges of those users. While the social contract is described as spreading a positive emotion, such as happiness, it is not restricted to a positive emotion and include other factors.

Figure 2:
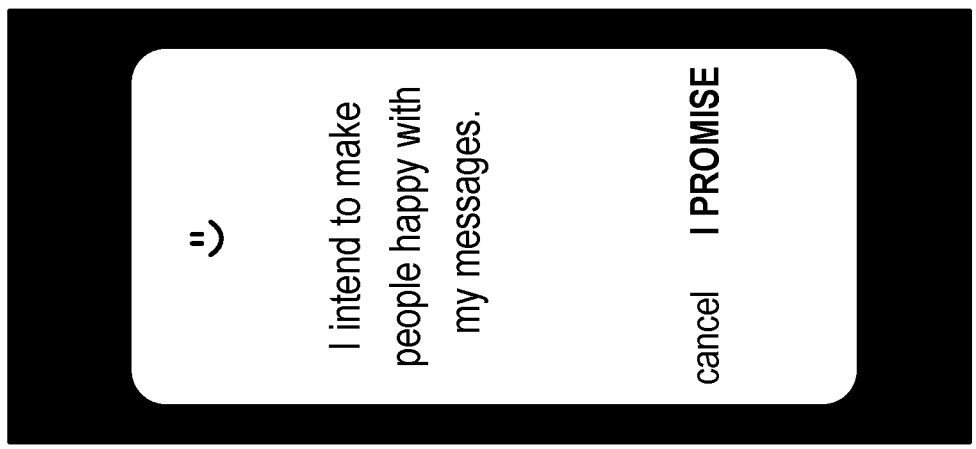
FIG. 2 shows example screenshots of a messaging app displaying the social contract, consistent with various embodiments.
Figure 2:
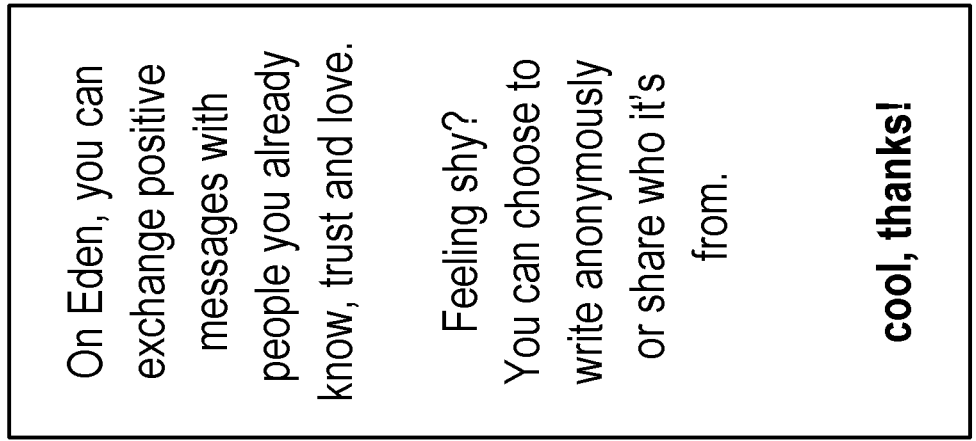

Users 125 are required to accept the social contract before they can send or receive messages. For example, when a first user 126 uses the messaging app 146 for the first time, the messaging app 146 displays the social contract, such as "I intend to make people happy with my messages" and requires the user to accept the contract before the first user 126 can send or receive any messages from other users. This message can remind the first user 126 that the messaging platform is about spreading positive emotions. FIG. 2 shows example screenshots of the messaging app displaying the social contract, consistent with various embodiments. In some embodiments, the GUIs of FIG. 2 are part of the messaging app 146. The GUI 205 displays a brief description of the messaging app and the GUI 210 displays the social contract. A user can send messages to other users only upon accepting the social contract, e.g., selecting "I Promise" option in the GUI 210. If the user does not accept the social contract, the messaging app does not let the user send messages to other users (but can receive messages from other users).

Some of the functionalities supported by the messaging app include sending a message to a user, receiving a message from a user, and posting a message that can be viewed by multiple users, recording videos of reactions to reading a message, recording "catch-up" videos having information about a particular user for consumption by a category of users, and recording videos of users having descriptive content, all of which are described in the following paragraphs.

Figure 3:
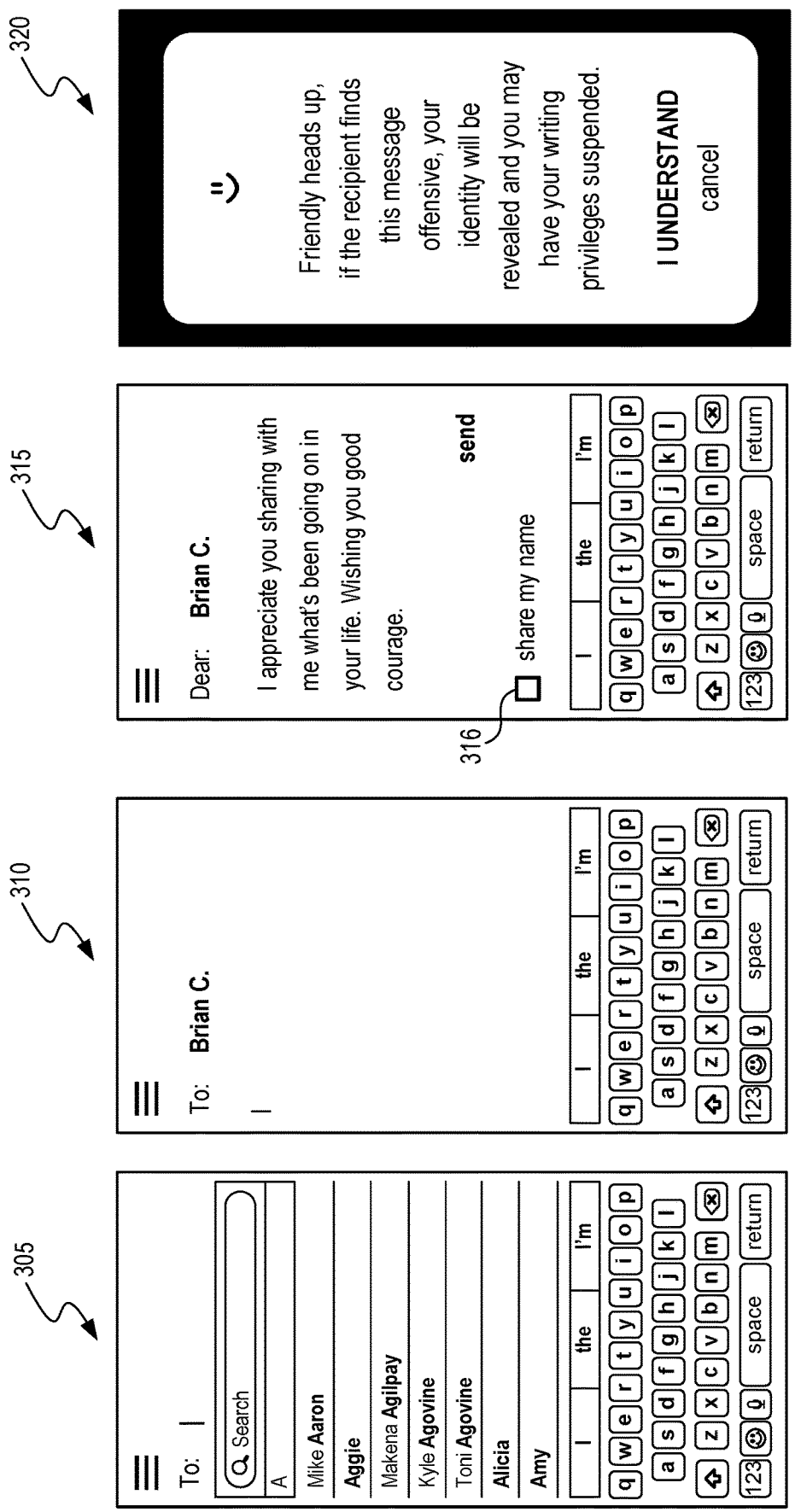
FIG. 3 shows example screenshots of the messaging app displaying contacts from an address book on a client device, consistent with various embodiments.

With respect to sending a message, in some embodiments, the messaging app lets the users 125 send messages to contacts in their address book on the client device. For example, the messaging app 146 enables the first user 126 to send messages to the contacts in the address book on the client device 136. That is, the first user 126 will be able to send a message 130 to a second user 127 if the contact information of the second user 127 is stored in the address book on the client device 136. FIG. 3 shows example screenshots of the messaging app displaying contacts from an address book on the client device, consistent with various embodiments. In some embodiments, the GUIs of FIG. 3 are part of the messaging app 146. The GUI 305 displays contacts from an address book of the first user 126 stored on the client device 136. The first user 126 may select one of the contacts, e.g., "Brian C." from the address book, as illustrated in the GUI 310. The first user 126 can then compose the message 130 and send it to the second user 127, as illustrated in the GUI 315. The message 130 can include text or multimedia content. However, in some embodiments, the message 130 is a text.

In some embodiments, the first user 126 can also choose to send the message 130 anonymously. For example, the GUI 315 shows an anonymous indicator 316, which when checked shares the user identifiable information (UII) of the first user 126 with the recipient along with the message 130, and when unchecked removes the UII from the message 130, thereby sending the message 130 anonymously. Further, in some embodiments, if a recipient finds a message to be offensive, the messaging app may show the UII to the recipient even if the message was sent anonymously. For example, if the first user 126 sends the message 130 to the second user 127 anonymously, and if the second user 127 found the message 130 to be offensive, the messaging app 147 can reveal the UII of the first user 126 to the second user 127 in the message. In some embodiments, this can act as a deterrent for sending offensive messages. The UII can include any information that can be used to identify or derive identity of the sender, such as a username, name of the user, telephone number, and email ID. The GUI 320 shows a note, which indicates that an identity of the sender will be revealed if the recipient finds the message to be offensive. In some embodiments, the note is shown only the first when the user sends an anonymous message.

While the messaging app 146, lets the first user 126 send messages to the contacts in the address book on the client device 136, in some embodiments, the messaging app 146 lets the first user 126 send a message to a contact that is not in the address book. The first user 126 may type in the contact information, such as a telephone number or email ID of the recipient rather than selecting from the address book. Further, regardless of whether the first user 126 can send messages to contacts that are not in the address book, the first user 126 may receive messages from contacts that are not in the address book of the first user 126.

With respect to receiving messages, the messaging app provides an option to the user to record a reaction of the user to reading the message. For example, when the second user 127 receives the message 130, the messaging app 147 can provide an option to the second user 127 to record a reaction 135 of the second user 127 to reading the message 130. The messaging app 147 provides this option prior to displaying the message 130 to the second user 127. If the second user 127 chooses to record the reaction 135, the messaging app 147 instructs a camera of the client device 137 to start a video recording of the second user 127 and then displays the message 130. The recording can happen in the background while the message 130 is displayed on a screen of the client device 137. The messaging app 147 records the video for a specified duration from the time the message is displayed, e.g., 30 seconds, 45 seconds, or 1 minute. Even after recording, the second user 127 can choose whether or not to send the reaction 135 to the first user 126. Further, the messaging app asks the second user 127 to indicate a type of the emotion the message 130 generated for the second user 127. The type of emotion can be a positive emotion, such as happiness, laughter, smile, joy, etc., or a negative emotion such as sad, disappointed, creepy, gross, or angry. The messaging app 147 can provide an indicator to indicate the type of emotion. For example, the positive emotion indicator can be an icon, a text, an image, a symbol or other representations of positive emotion, such as a "like" image, a thumbs up image, a smiley icon, a smile symbol, and the negative emotion indicator can be an icon, a text, an image, a symbol or other representations of negative emotion, such as a "dislike" image, a thumbs down image, a frown face icon, or a frown face symbol. By selecting one of these two indicators, the second user 127 can indicate the type of emotion generated by the message 130. For the sake of brevity, an indication of positive emotion is referred to as a "like," and an indication of a negative emotion is referred to as a "dislike." In some embodiments, if the second user 127 indicates that the message 130 generated a negative emotion, the messaging app 147 provides an option for the second user 127 to report the sender of the message 130, e.g., the first user 126, to the messaging platform in the server 105. Upon receiving a report against the first user 126, the server 105 stores the report in the storage system 110, which can be used in determining whether to suspend the writing privileges of the first user 126.

Figure 4:
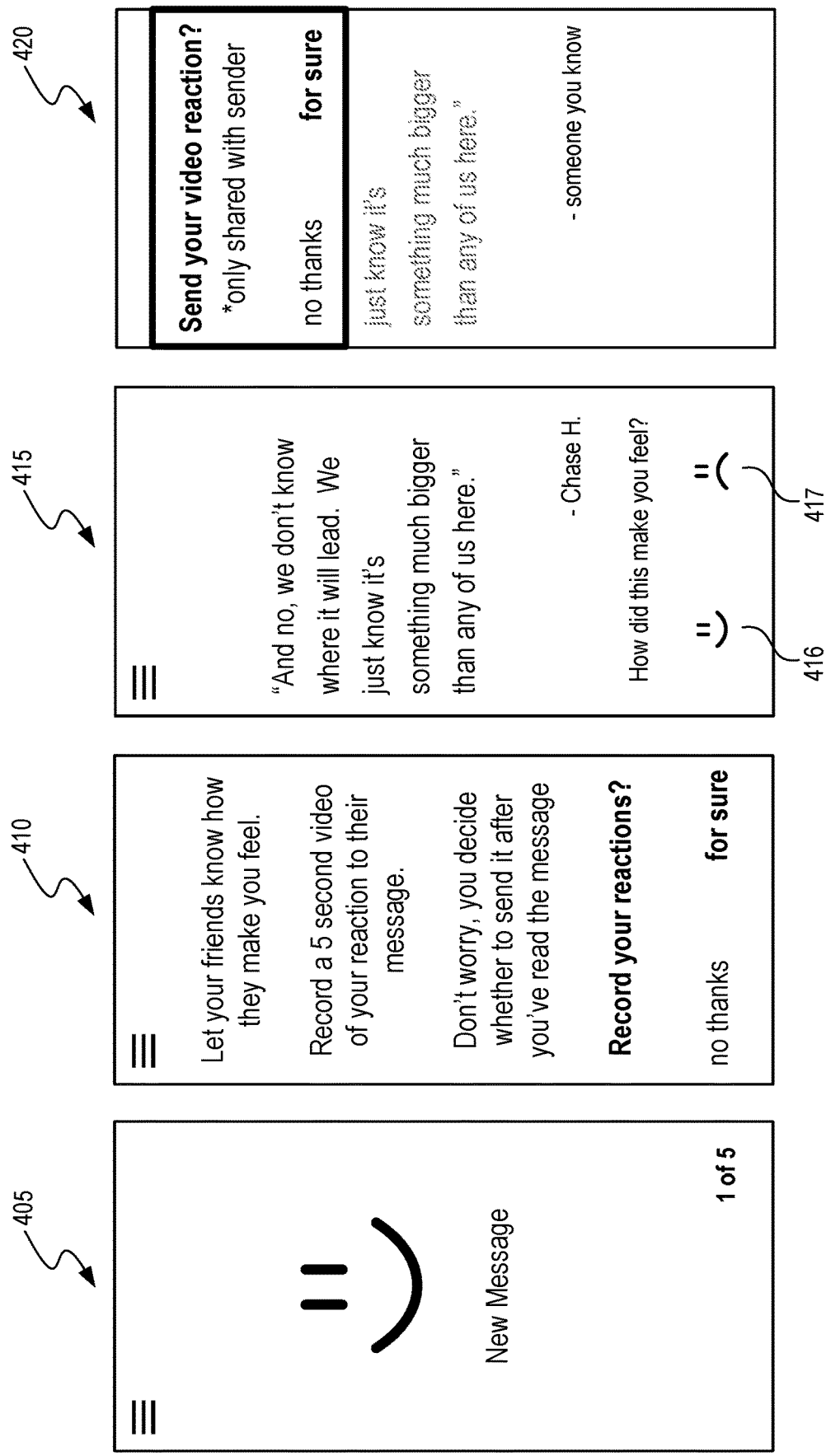
FIG. 4 shows example screenshots of the messaging app displaying a received message, consistent with various embodiments.

FIG. 4 shows example screenshots of the messaging app displaying a received message, consistent with various embodiments. In some embodiments, the GUIs of FIG. 4 are part of the messaging app 147. The GUI 405 displays a notification of a new message. The GUI 410 displays a prompt asking the second user 127 to confirm whether the second user 127 wants to record the reaction to reading the message 130. If the second user 127 confirms the recording of the reaction, the messaging app 147 instructs the camera of the client device 137 to start the video recording and then displays the GUI 415, which displays the message 130, otherwise the messaging app just displays the GUI 415. The GUI 415 also provides emotion indicators such as a positive emotion indicator 416 and a negative emotion indicator 417. The second user 127 can indicate the type of emotion generated by the message 130 by selecting one of the two emotion indicators 416 and 417. The GUI 420 displays a prompt asking the second user 127 to confirm whether the second user 127 wants to send the recording of the reaction 135 to the sender of the message 130, e.g., the first user 126. If the second user 127 confirms sending of the reaction, the reaction 135 is sent to the first user 126.

The messaging app 147 transmits the reaction 135 (if the second user 127 provided consent to sending) and the type of emotion to the server 105, which is then transmitted to the first user 126. The first user 126 can view the reaction 135 of the second user 127 and the type of emotion felt by the second user 127 in reading the message 130 in the messaging app 146. In some embodiments, the messaging app 146 includes an inbox folder, which includes all messages received by a user, and an outbox folder which includes all messages sent by the user. For example, an inbox folder in the messaging app 146 associated with the first user 126, that can include all messages received by the first user 126, and an outbox folder that includes all messages sent by the first user 126. If any of the messages in these folders have an associated reaction, then those messages would also include the associated reaction which the first user 126 can playback anytime. For example, if the any of the messages in the inbox folder of the first user 126 has reactions of the first user 126 in reading those messages, those videos would be tagged to the message. A thumbnail or any other video indicator that is indicative of a video is displayed in association with the message, and the first user 126 can playback the video by selecting the video indicator. Similarly, if any message in the outbox folder has a reaction of a recipient of the message, the message is tagged with the video, and the first user 126 can playback the video by selecting the associated video indicator.

Figure 5:
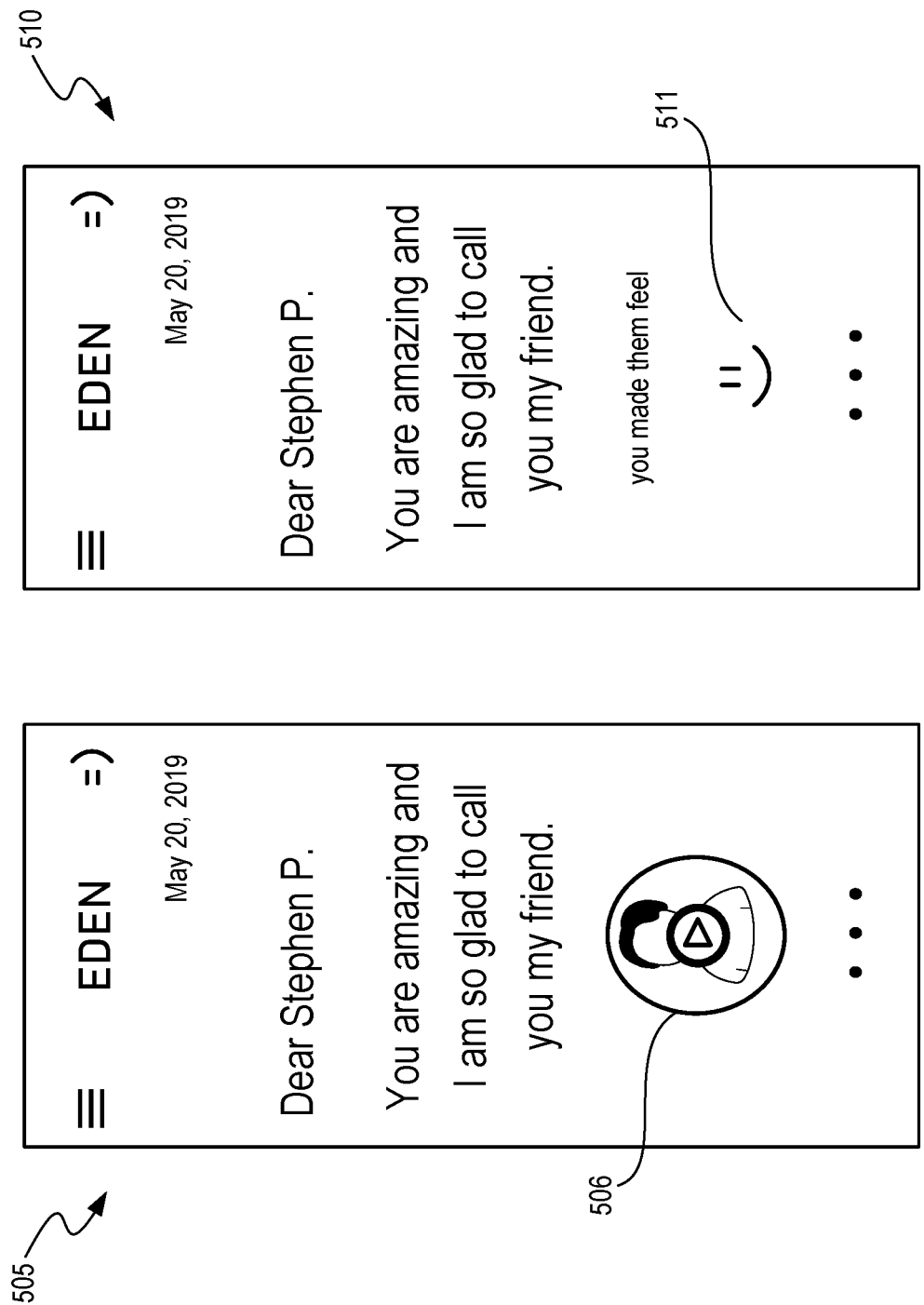
FIG. 5 shows example screenshots of a message in an outbox folder of a user, consistent with various embodiments.

FIG. 5 shows example screenshots of a message in an outbox folder of a user, consistent with various embodiments. In some embodiments, the GUIs of FIG. 5 are part of the messaging app 146. The GUI 505 shows a message in the outbox folder of a user, e.g., the first user 126, that is sent to another user "Stephen P." The message is also associated with a reaction of the recipient, which is indicated by the video thumbnail 506. The first user 126 can select the video thumbnail 506 to play the video. The GUI 510 shows the positive emotion indicator 511, which is indicative of type of emotion, e.g., positive emotion, felt by the recipient in reading the message from the first user 126.

The messaging platform facilitates a user in strengthening existing relationships. The messaging platform categorizes the contacts in the address book of a user into multiple categories, each of which is representative of a relationship type of the user with the contacts in those categories. In some embodiments, the messaging platform categorizes the contacts based on a degree of interaction between the users in the messaging platform.

Figure 6:
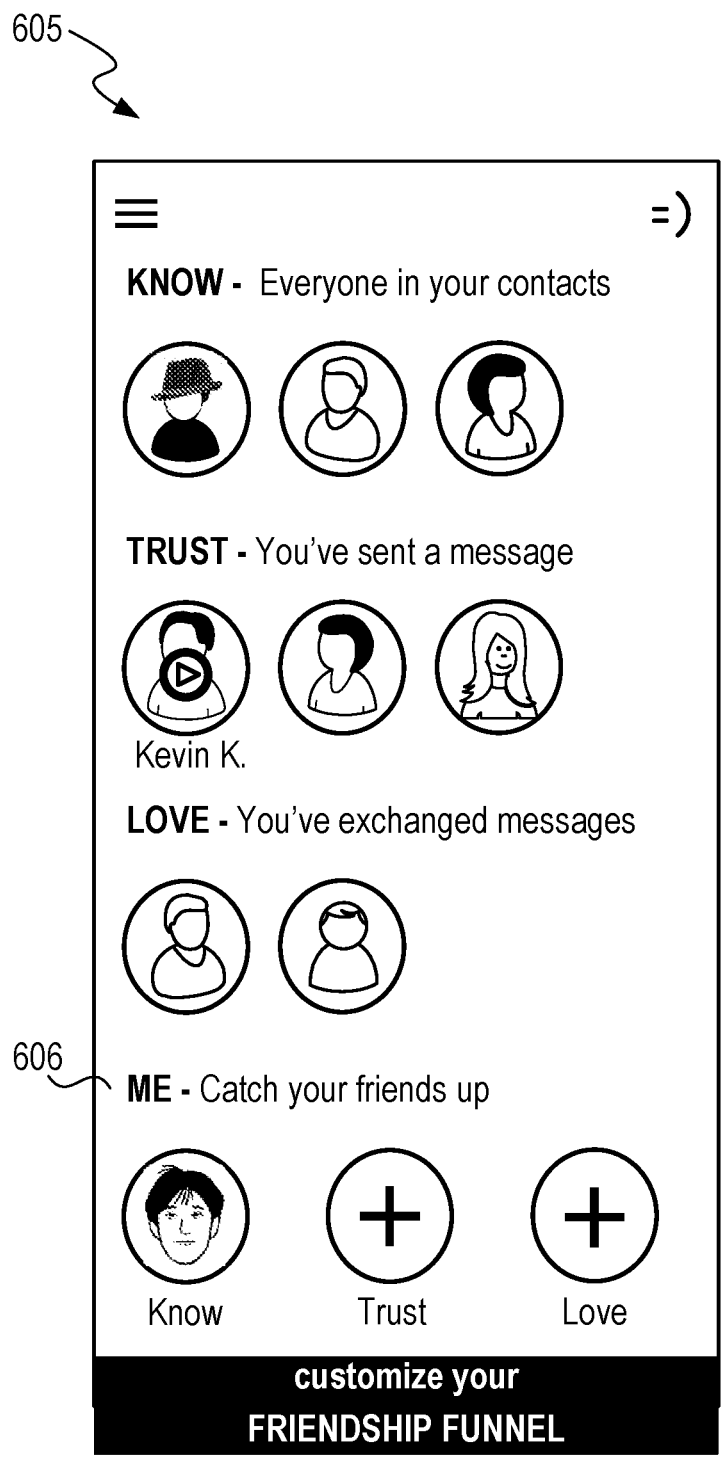
FIG. 6 shows an example screenshot of categorization of address book contacts of a user, consistent with various embodiments.

FIG. 6 shows an example screenshot of categorization of address book contacts of a user, consistent with various embodiments. In some embodiments, the GUIs of FIG. 6 are part of the messaging app 146. The messaging app 146 categories the contacts in the address book of the first user 126 into a "know," "trust" and "love" category as illustrated in the GUI 605. In some embodiments, the "know" category includes all contacts from the address book of the first user 126. In some embodiments, the "trust" category includes those contacts from the address book to whom the first user 126 has sent a message. In some embodiments, the "trust" category includes those contacts from the address book with whom the first user 126 has exchanged messages (e.g., sent messages to and received messages from). While the messaging app 146 can automatically categorize the contacts, the first user 126 can also assign one of the above categories to a specified contact. Further, the specified contact can move from one category to another if the interaction of the first user 126 with the specified contact changes. For example, the specified contact may initially be in "know" category but may move to "trust" category when the first user 126 sends a message to the specified contact, and may further move to the "love" category when the first user 126 and the specified user have exchanged messages. In some embodiments, the messaging app 146 can transmit the categorization information of the contacts to the server 105, which can store the categorization information in the storage system 110, e.g., in an encrypted format.

In some embodiments, the criteria to assign a specified contact to a specified category can be user-defined. For example, the degree of interaction with the specified contact, e.g., the number of messages that the first user 126 has to send to the specified contact, for the specified contact to be categorized into "trust" category can be user-defined. Similarly, the number of messages to be exchanged between the first user 126 and the specified contact for the specified contact to be categorized into "love" category can be user-defined.

Such categorization can encourage the user to strengthen a specified relationship. For example, the first user 126 can look at the categorization and see that a specified contact, "Kevin", is in the "trust" category and may feel that they haven't communicated with each other in a while and therefore, get encouraged to exchange messages with him. Upon exchanging messages with "Kevin," "Kevin" may be moved to the "love" category.

The messaging app 146 also allows the first user 126 to share "catch-up" videos with his/her contacts. In some embodiments, a "catch-up" video is a video recording having some information of the first user 126. For example, the catch-up video of the first user 126 can be a video of the first user 126 providing some information about what's happening with the first user 126, which helps his/her contacts catch up with the first user 126. The first user 126 can generate different catch-up videos for different categories, e.g., having varying degree of personal information in the messaging app 146 as illustrated in the GUI 605 by catch-up video section 606. For example, the first user 126 can create a first catch-up video and assign to the "know" category, create a second catch-up video and assign to the "trust" category, and create a third catch-up video and assign to the "love" category. In some embodiments, the catch-up video generated for the "love" category can have more personal information about the first user 126 than the catch-up video generated for the "trust" category as the first user 126 has a closer and stronger relationship with contacts in the "love" category than in the "trust" category. Also, the allotted duration of catch-up video recording for different categories can be different. For example, the allotted duration for the catch-up video can be the highest for the "love" category and the lowest for the "know" category. In the catch-up video section 606, the first user 126 has generated a catch-up video only for the "know" category. When a specified contact of the first user 126 requests for viewing a catch-up video of the first user 126, the messaging app determines the category to which the specified contact belongs and provides access to the catch-up video of the first user 126 that is assigned to the determined category. The specified contact may not have access to catch-up videos of the first user 126 assigned to categories other than the one to which the specified contact belongs. In some embodiments, the messaging app installed a client device associated with the specified contact may interact with the server 105 to find the categorization of the specified contact in the first user's 126 messaging app.

Similarly, when the first user 126 requests for viewing a catch-up video of a contact, such as "Kevin," e.g., by tapping on the thumbnail of the contact in the "know category," the messaging app 146 determines the category to which the first user 126 belongs in Kevin's messaging app and provides access to the catch-up video of Kevin that is assigned to the category of the first user 126. In some embodiments, the messaging app 146 may indicate a number of the catch-up videos viewed by the first user 126, e.g., as a percentage of a total number of catch-up videos of the contacts accessible by the first user 126, such as 60% of catch-up videos viewed."

The messaging platform also lets users post or publish messages ("public post" or "public message") that can be viewed by all users of the messaging platform. Users can also tag or include videos in their public posts. A video tagged to a public post can be a video recording of what's on a user's mind or what the user feels about another public post. In some embodiments, the public posts are displayed anonymously, that is, the messaging app removes the UII of the user who posted the public post or commented on the public post.

Figure 7:
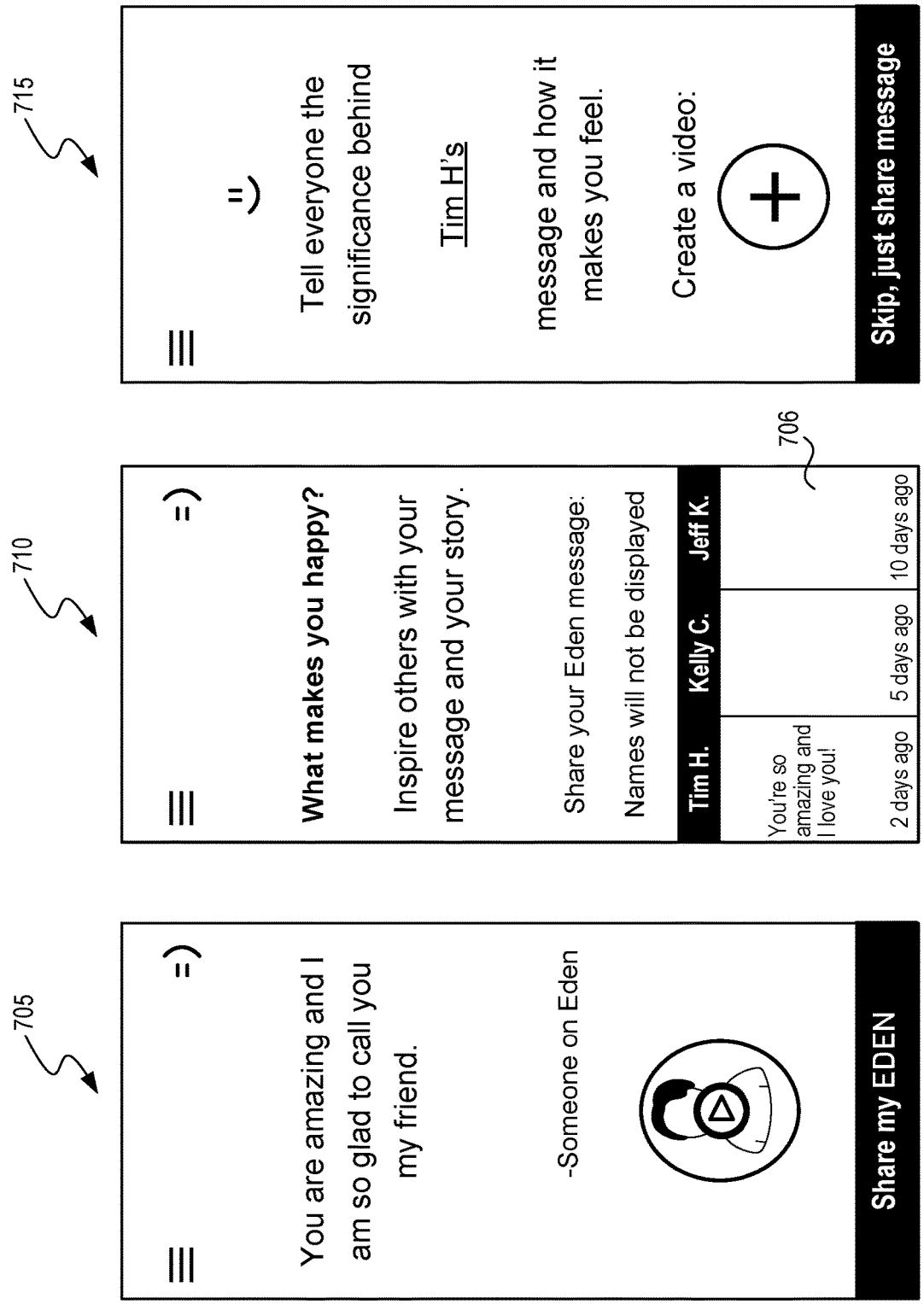
FIG. 7 shows example screenshots of public posts, consistent with various embodiments.

FIG. 7 shows example screenshots of public posts, consistent with various embodiments. In some embodiments, the GUIs of FIG. 7 are part of the messaging app 146. The GUI 705 displays a public post by a user of the messaging platform. The GUI 710 displays public posts by multiple users of the messaging platform. The first user 126 can choose to comment on one of the public posts. The GUI 715 allows the first user 126 to comment on one of the public posts displayed in the GUI 710. The first user 126 may also choose to add a video to the comment, as illustrated in the GUI 710.

Referring back to FIG. 1 and as described above, the messaging platform not only promotes spreading positive emotion between users, but also aids in strengthening an existing relationship between users. The messaging platform restricts users found to be in violation of the social contract from sending messages by suspending their writing privileges. The server 105 stores various types of data regarding the users 125 in the storage system 110, such as user profile information of the users (e.g., name, telephone number, email ID, profile picture), the messages exchanged between the users, a like or dislike received for each of the messages, any reports received against the users, reaction videos of the users, and at least some information regarding contact categories of each of the users 125. The server 105 tracks various metrics for each of the users 125 in determining whether to suspend the writing privileges for a user. For example, a metric can include one or more of a number of times a specified user has received dislikes from a particular user, a number of times a specified user has received dislikes from one or more of the users 125, a percentage of messages sent by the specified user that received dislikes, a total number of messages sent by the specified user, a period for which the specified user has been active on the messaging platform, a number of times the specified user is reported to the messaging platform, a frequency at which a dislike is received (e.g., how many dislikes per week/month, per 100 messages), a frequency at which the specified user is reported, and such. The server 105 can define threshold limits for each metric or a combination of the metrics. The server 105 can suspend the writing privileges of the specified user when one or more metrics exceed their thresholds. Suspending the writing privileges can prevent the specified user from sending messages and therefore, can stop spreading of negative emotions by the specified user. After the suspension, the specified user may continue to receive messages from other users, but would not be able to send messages to other users. In some embodiments, the suspended user can appeal to the messaging platform to regain writing privileges.

Figure 8:
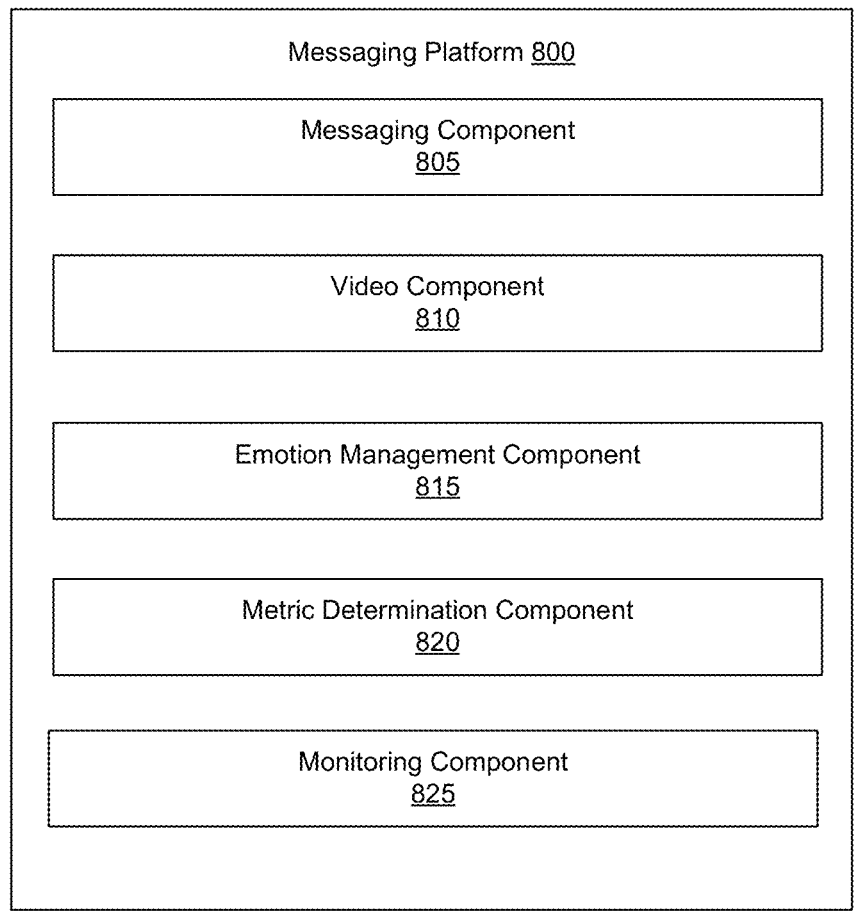
FIG. 8 is a block diagram of a messaging platform, consistent with various embodiments.

FIG. 8 is a block diagram of a messaging platform, consistent with various embodiments. The messaging platform 800 includes a messaging component 805, a video component 810, an emotion management component 815, a metric determination component 820, and a monitoring component 825. The messaging component 805 facilitates in exchanging messages between users 125, e.g., sending a message from one user to another user. The video component 810 facilitates in recording videos, such as reactions and catch-up videos. The emotion management component 815 determines the type of emotion generated by the messages exchanged in the messaging platform 800. The metric determination component 820 can determine various metrics associated with the users 125, e.g., for monitoring the adherence of the users 125 to the social contract of the messaging 800 platform. The monitoring component 825 can monitor the adherence of the users 125 to the social contract of the messaging 800 platform and suspend writing privileges of the users found violating the social contract.

The messaging platform 800 can be implemented in a distributed architecture. That is, the components of the messaging platform 800 can be distributed across multiple entities. For example, some components can be implemented on the server 105 and some in the client-side portion, e.g., in the messaging app. In another example, all the components can be implemented in both the server 105 and the client-side portion.

Additional details with respect to the components of the messaging platform 800 are described at least with reference to FIGS. 9 and 10 below. Note that the messaging platform 800 illustrated in FIG. 8 is not restricted to having the above described components. The messaging platform 800 can include lesser number of components, e.g., functionalities of two components can be combined into one component, or can include more number of components, e.g., components that perform other functionalities. In some embodiments, the functionalities of one or more of the above components can be split into two or more components.

Figure 9:
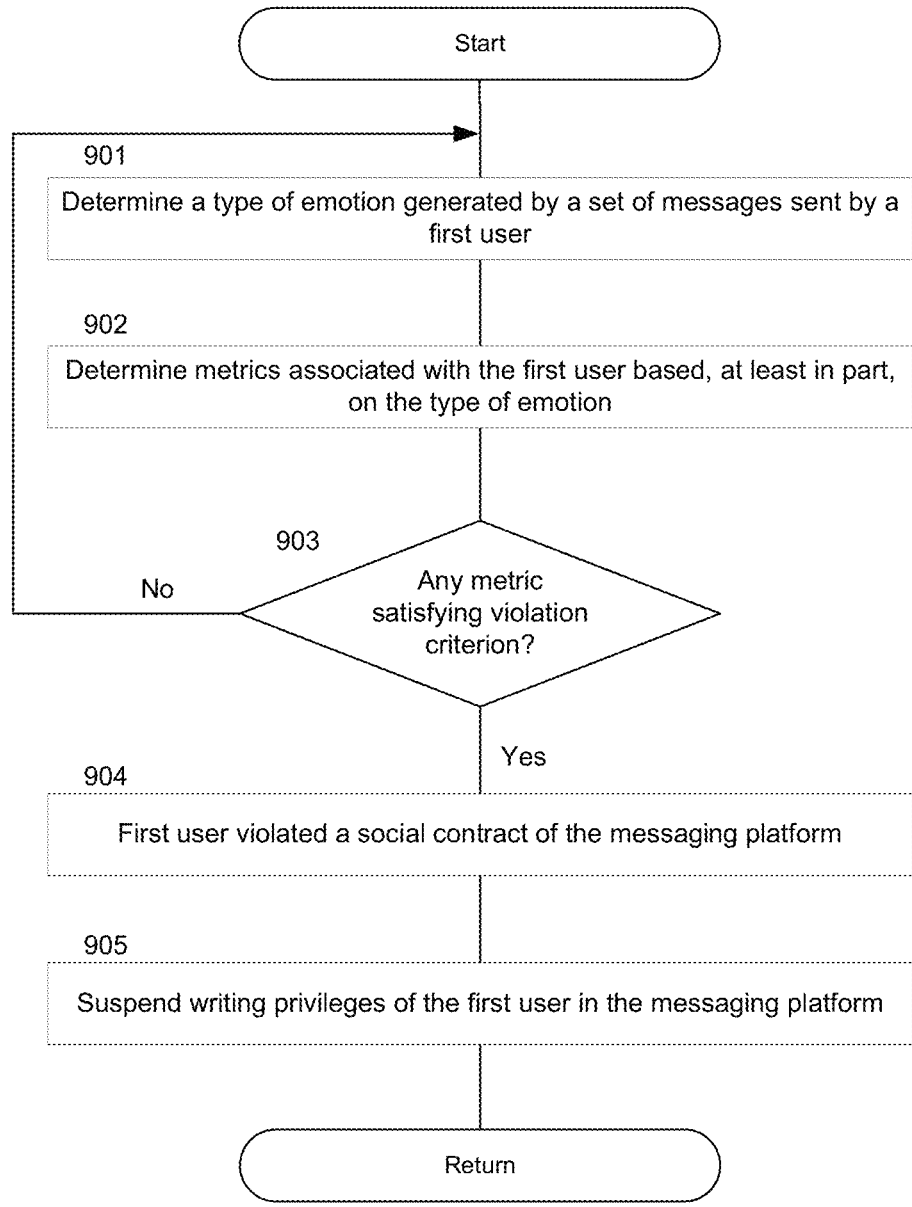
FIG. 9 is a flow diagram of a process 900 for managing users in a messaging platform, consistent with various embodiments.

FIG. 9 is a flow diagram of a process 900 for managing users in a messaging platform, consistent with various embodiments. In some embodiments, the process 900 can be implemented in the environment 100 and using the messaging platform 800 of FIG. 8. At block 901, the emotion management component 815 determines a type of emotion generated by a set of messages sent by a user, e.g., the first user 126. In some embodiments, the type of emotion generated by a particular message from the first user 126 is indicated by a recipient of the particular message, e.g., as described at least with reference to FIGS. 1 and 4.

At block 902, the metric determination component 820 determines one or more metrics associated with the first user 126. In some embodiments, the metrics can be based on the type of emotion. As described at least with reference to FIG. 1, a metric can include one or more of a number of times a specified user has received dislikes from a particular user, a number of times a specified user has received dislikes from one or more of the users 125, a percentage of messages sent by the specified user that received dislikes, a total number of messages sent by the specified user, a period for which the specified user has been active on the messaging platform, a number of times the specified user is reported to the messaging platform, a frequency at which a dislike is received (e.g., how many dislikes per week/month, per 100 messages), a frequency at which the specified user is reported, and such.

At block 903, the monitoring component 825 determines if any of the metrics satisfies the criterion for violation. The monitoring component 825 can define threshold limits for each metric or a combination of the metrics. In some embodiments, the criterion can be that one or more metrics exceed one or more thresholds. For example, one criterion can be that a first metric exceeds a first threshold and a second metric exceeds a second threshold. In another example, the criterion can be that at least one of the first metric and the second metric exceeds a corresponding threshold. If the monitoring component 825 determines that none of the metrics satisfy the violation criterion, the emotion management component 815 continues to monitor the type of emotion received for the messages sent by the first user 126.

On the other hand, if the monitoring component 825 determines that one or more of the metrics satisfy the violation criterion, at block 904, the monitoring component 825 determines that the first user 126 violated the social contract of the messaging platform 800.

At block 905, the monitoring component 825 suspends the writing privileges of the first user 126. Suspending the writing privileges can prevent the first user 126 from sending messages and therefore, can stop spreading of negative emotions by the first user 126.

While the above process 900 is described with respect to a single user, e.g., the first user 126, in some embodiments, the process 900 is executed for each of the users 125.

Figure 10:
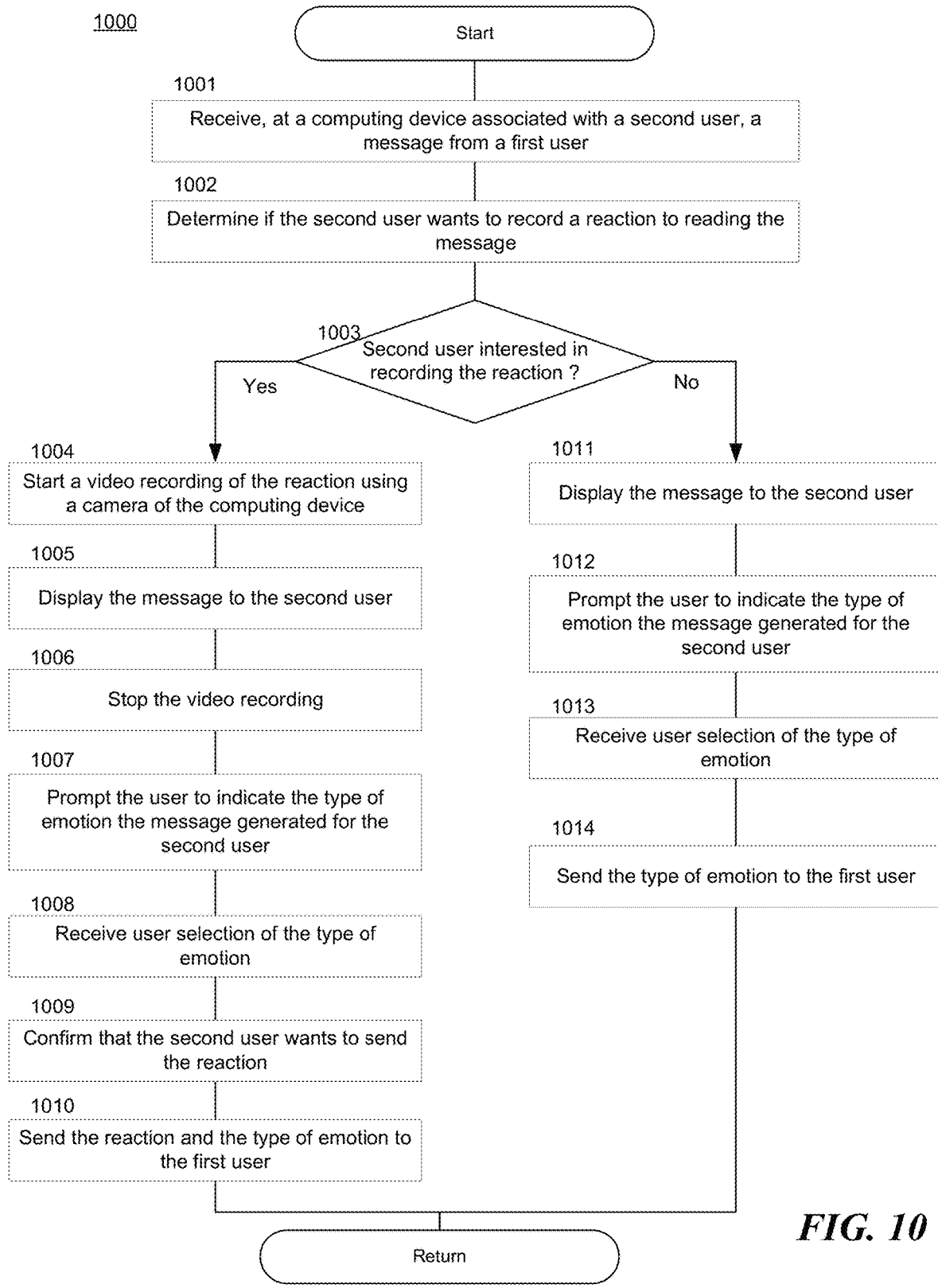
FIG. 10 is a flow diagram of a process 1000 for displaying a message to a user, consistent with various embodiments.

FIG. 10 is a flow diagram of a process 1000 for displaying a message to a user, consistent with various embodiments. In some embodiments, the process 1000 can be implemented in the environment 100 of FIG. 1 and using the messaging platform 800 of FIG. 8. At block 1001, the messaging component 805 receives a message at a client device associated with a user. For example, the messaging component 805 in the client device 137 associated with the second user 127 receives the message 130 from the first user 126.

At block 1002, the video component 810 determines if the second user 127 is interested in recording a reaction to reading the message 130. For example, the video component 810 can display a prompt that asks if the second user 127 is interested in recording the reaction.

At determination block 1003, if the second user 127 indicated interest in recording the reaction, the process 1000 proceeds to block 1004, where the video component 810 starts a video recording using the camera, e.g., front-facing camera of the client device 137, to record the reaction of the second user 127, as described at least with reference to FIG. 4.

At block 1005, the messaging component 805 displays the message 130 to the second user 127. The second user 127 may react to the message 130 by exhibiting some emotion while reading the message 130, e.g., a smile, a grin, a frown, surprise, confused, through facial expressions or other body language. The emotion is captured in the video recording as the reaction 135.

At block 1006, the video component 810 stops the video recording. In some embodiments, the video component 810 continues to record the video for a specified duration after the message 130 is displayed. In some embodiments, the starting and stopping of the recording is done automatically by the video component 810. That is, the second user 127 may not have to manually start or stop the recording, and the recording can happen in the background while the second user 127 is reading the message 130 displayed on a display screen of the client device 137. This way, the reaction 135 can be a candid video of the reaction of the second user 127.

At block 1007, the emotion management component 815 generates a prompt on the client device 137 asking the second user 127 to identify the type of emotion the message 130 generated for the second user 127. In some embodiments, the emotion management component 815 can display a positive emotion indicator 416 and a negative emotion indicator 417, which the second user 127 can use to indicate the type of emotion, as described at least with reference to FIG. 4.

At block 1008, the emotion management component 815 receives a user selection of the type of emotion.

At block 1009, the video component 810 confirms that the second user 127 is still interested in sending the reaction 135 to the first user 126. For example, the video component 810 can display a prompt asking the second user 127 to confirm if the second user 127 wants to send the reaction 135 to the first user 126.

At block 1010, the messaging component 805 transmits the reaction 135 and the type of emotion to the first user 126 upon receiving the confirmation from the second user 127. In an event the second 127 does not confirm sending of the reaction, then the messaging component 805 transmits the type of emotion but not the reaction 135.

Referring back to determination block 1003, if the second user 127 is not interested in recording the reaction, the process proceeds to block 1011, where the messaging component 805 displays the message 130 to the second user 127.

At block 1012, the emotion management component 815 generates a prompt on the client device 137 asking the second user 127 to identify the type of emotion the message 130 generated for the second user 127, e.g., as described with reference to block 1007.

At block 1013, the emotion management component 815 receives a user selection of the type of emotion.

At block 1014, the messaging component 805 transmits the type of emotion to the first user 126.

Figure 11:
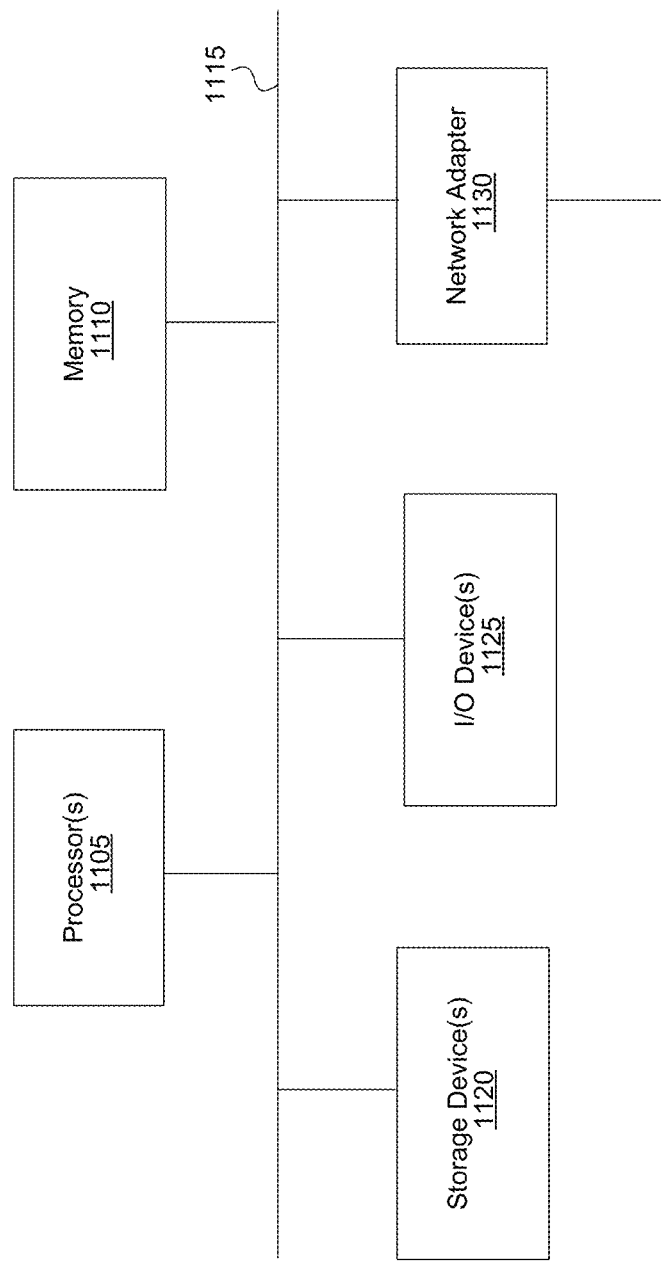
FIG. 11 is a block diagram of a processing system that can implement operations of the disclosed embodiments.

FIG. 11 is a block diagram of a computer system as may be used to implement features of the disclosed embodiments. The computing system 1100 may be used to implement any of the entities, components or services depicted in the examples of the foregoing figures (and any other components described in this specification). The computing system 1100 may include one or more central processing units ("processors") 1105, memory 1110, input/output devices 1125 (e.g., keyboard and pointing devices, display devices), storage devices 1120 (e.g., disk drives), and network adapters 1130 (e.g., network interfaces) that are connected to an interconnect 1115. The interconnect 1115 is illustrated as an abstraction that represents any one or more separate physical buses, point to point connections, or both connected by appropriate bridges, adapters, or controllers. The interconnect 1115, therefore, may include, for example, a system bus, a Peripheral Component Interconnect (PCI) bus or PCI-Express bus, a HyperTransport or industry standard architecture (ISA) bus, a small computer system interface (SCSI) bus, a universal serial bus (USB), IIC (I2C) bus, or an Institute of Electrical and Electronics Components (IEEE) standard 1394 bus, also called "Firewire".

The memory 1110 and storage devices 1120 are computer-readable storage media that may store instructions that implement at least portions of the described embodiments. In addition, the data structures and message structures may be stored or transmitted via a data transmission medium, such as a signal on a communications link. Various communications links may be used, such as the Internet, a local area network, a wide area network, or a point-to-point dial-up connection. Thus, computer readable media can include computer-readable storage media (e.g., "non-transitory" media) and computer-readable transmission media.

The instructions stored in memory 1110 can be implemented as software and/or firmware to program the processor(s) 1105 to carry out actions described above. In some embodiments, such software or firmware may be initially provided to the processing system 1100 by downloading it from a remote system through the computing system 1100 (e.g., via network adapter 1130).

The embodiments introduced herein can be implemented by, for example, programmable circuitry (e.g., one or more microprocessors) programmed with software and/or firmware, or entirely in special-purpose hardwired (non-programmable) circuitry, or in a combination of such forms. Special-purpose hardwired circuitry may be in the form of, for example, one or more ASICs, PLDs, FPGAs, etc.

Remarks

The above description and drawings are illustrative and are not to be construed as limiting. Numerous specific details are described to provide a thorough understanding of the disclosure. However, in some instances, well-known details are not described in order to avoid obscuring the description. Further, various modifications may be made without deviating from the scope of the embodiments. Accordingly, the embodiments are not limited except as by the appended claims.

Reference in this specification to "one embodiment" or "an embodiment" means that a particular feature, structure, or characteristic described in connection with the embodiment is included in at least one embodiment of the disclosure. The appearances of the phrase "in one embodiment" in various places in the specification are not necessarily all referring to the same embodiment, nor are separate or alternative embodiments mutually exclusive of other embodiments. Moreover, various features are described which may be exhibited by some embodiments and not by others. Similarly, various requirements are described which may be requirements for some embodiments but not for other embodiments.

The terms used in this specification generally have their ordinary meanings in the art, within the context of the disclosure, and in the specific context where each term is used. Terms that are used to describe the disclosure are discussed below, or elsewhere in the specification, to provide additional guidance to the practitioner regarding the description of the disclosure. For convenience, some terms may be highlighted, for example using italics and/or quotation marks. The use of highlighting has no influence on the scope and meaning of a term; the scope and meaning of a term is the same, in the same context, whether or not it is highlighted. It will be appreciated that the same thing can be said in more than one way. One will recognize that "memory" is one form of a "storage" and that the terms may on occasion be used interchangeably.

Consequently, alternative language and synonyms may be used for any one or more of the terms discussed herein, nor is any special significance to be placed upon whether or not a term is elaborated or discussed herein. Synonyms for some terms are provided. A recital of one or more synonyms does not exclude the use of other synonyms. The use of examples anywhere in this specification including examples of any term discussed herein is illustrative only, and is not intended to further limit the scope and meaning of the disclosure or of any exemplified term. Likewise, the disclosure is not limited to various embodiments given in this specification.

Those skilled in the art will appreciate that the logic illustrated in each of the flow diagrams discussed above, may be altered in various ways. For example, the order of the logic may be rearranged, substeps may be performed in parallel, illustrated logic may be omitted; other logic may be included, etc.

Without intent to further limit the scope of the disclosure, examples of instruments, apparatus, methods and their related results according to the embodiments of the present disclosure are given below. Note that titles or subtitles may be used in the examples for convenience of a reader, which in no way should limit the scope of the disclosure. Unless otherwise defined, all technical and scientific terms used herein have the same meaning as commonly understood by one of ordinary skill in the art to which this disclosure pertains. In the case of conflict, the present document, including definitions will control.

I claim:

1. A computer-implemented method, comprising:

receiving, at a computing device associated with a first user of a messaging platform, a message from a computing device of a second user, wherein the first user and second user are members of a group;

determining, at the computing device, whether the first user provided consent for a video recording of the first user and whether the second user has requested the video recording of the first user, the video recording indicative of a reaction of the first user to reading the message;

in response to the receiving the consent and determining that the second user requested the video recording of the first user, capturing the reaction of the first user to reading the message in the recording, wherein the capturing includes:

starting, by the computing device and prior to displaying the message to the first user, a recording of the video of the first user using a camera of the computing device facing the first user, and displaying, by the computing device, the message on a display of the computing device of the first user; and transmitting, by the computing device, the reaction to the computing device of the second user;

determining, by the messaging platform executing at a server, whether the second user is violating a social contract of the messaging platform based on metrics associated with the second user, wherein the metrics are indicative of a specified user selecting an option on a specified display associated with the specified user.

2. The method of claim 1 further comprising:

prompting the first user to indicate, by selecting one of a plurality of indicators, a type of emotion the message generated for the first user, wherein the plurality of indicators includes a "like" indicator that is indicative of a positive emotion and a "dislike" indicator that is indicative of a negative emotion.

3. The method of claim 2 further comprising:

receiving a user selection of the "dislike" indicator from the first user that is indicative of a negative emotion.

4. The method of claim 3 further comprising:

generating a prompt at the computing device that provides an option for the first user to report the second user to the messaging platform.

5. The method of claim 4 further comprising:

receiving, at the messaging platform executing at a server and from the computing device, a report on the second user from the first user.

6. The method of claim 1, wherein the metrics include one or more of a first number of dislikes received for the second user from a specified user, a second number of dislikes received for the second user from multiple users, a third number of reports received against the second user, a frequency at which the dislikes are received, or a frequency at which the reports are received.

7. The method of claim 6 further comprising:

determining, at the server, if a combination of the metrics exceeds a specified threshold; and responsive to a determination that the combination of the metrics exceeds the specified threshold, suspending writing privileges of the second user that disables the second user from sending one or more messages to any of multiple users of the messaging platform.

8. The method of claim 1 further comprising:

receiving, at the computing device, a request from the first user for sending a specified message to a third user of the messaging platform;

sending the specified message to the third user.

9. The method of claim 8, wherein sending the specified message includes sending the specified message to the third user anonymously.

10. The method of claim 8, wherein third user is one of multiple contacts in an address book associated with the first user, wherein the address book is stored in the computing device.

11. The method of claim 1, wherein receiving the message includes:

determining if the message is sent by the second user anonymously, and in response to a determination that the message is sent anonymously, removing user identifiable information associated with the second user from the message prior to displaying the message.

12. The method of claim 11 further comprising:

determining if the first user reported the second user to the messaging platform; and in response to a determination that the first user reported the second user, revealing the user identifiable information associated with the second user to the first user.

13. The method of claim 1 further comprising:

generating, at the computing device, multiple categories of contacts, each category being representative of a relationship type of the first user with contacts in that category, the relationship type determined based on a degree of interaction between the first user and the contacts in the messaging platform.

14. The method of claim 13 further comprising:

receiving, at the computing device, multiple videos generated by the first user, wherein each video contains information regarding the first user that is customized for a specified relationship type; and assigning a specified video that is generated for a specified relationship type to a corresponding specified category, wherein contacts in the specified category are restricted from viewing videos other than the one assigned to the specified category.

15. The method of claim 13, wherein generating the multiple categories includes:

generating a first category of the multiple categories, which includes all contacts from an address book stored in the computing device, generating a second category of the multiple categories, which includes those contacts from the address book to whom the first user has sent one or more messages, and generating a third category of multiple categories which includes those contacts from the address book with whom the first user has exchanged one or more messages.

16. The method of claim 15 further comprising:

assigning, at the computing device, a first video to the first category, a second video to second category and a third video to the third category, wherein each of the three videos has a recording of the first user with content relevant to the corresponding category, wherein contacts in a category of the multiple categories are restricted from viewing videos other than the one assigned to the corresponding category.

17. The method of claim 1 further comprising:
receiving, at a specified computing device associated with a specified user, a request for viewing a video associated with the first user;
determining a specified category of multiple categories into which the specified user is categorized; and
displaying a specified video that is assigned to the specified category to the specified user.

18. The method of claim 1 further comprising:
determining if a specified contact in any of multiple categories of contacts of the first user has an associated video; and
displaying, at the computing device, a video indicator in association with specified contact, the video indicator indicating that the specified contact has the associated video.

19. The method of claim 18 further comprising:
receiving a request from the first user to view the associated video; and
determining, at a server, a specified category to which the first user is classified into for the specified contact,
retrieving, from a server, the associated video corresponding to the specified category.

20. The computer-implemented method of claim 1, wherein the group is the address book on the computing device of the first user, the computing device of the second user, or any combination thereof; and wherein the reaction is not transmitted in real-time to the computing device of the second user.

* * * * *